United States Patent
Syafril et al.

(10) Patent No.: US 12,093,415 B2
(45) Date of Patent: Sep. 17, 2024

(54) DATA INTERMEDIARY SYSTEM AND DATA INTERMEDIARY METHOD

(71) Applicant: Hitachi, Ltd., Tokyo (JP)

(72) Inventors: Bandara Syafril, Tokyo (JP); Mitsuhiro Kitani, Tokyo (JP); Satoshi Iimuro, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 324 days.

(21) Appl. No.: 17/721,126

(22) Filed: Apr. 14, 2022

(65) Prior Publication Data

US 2022/0382893 A1   Dec. 1, 2022

(30) Foreign Application Priority Data

May 28, 2021   (JP) .................................. 2021-090155

(51) Int. Cl.
G06F 21/62   (2013.01)
G06F 11/34   (2006.01)
G06F 21/57   (2013.01)

(52) U.S. Cl.
CPC ...... G06F 21/6218 (2013.01); G06F 11/3438 (2013.01); G06F 21/577 (2013.01)

(58) Field of Classification Search
CPC .... G06F 11/3438; G06F 40/20; H04L 67/535; H04L 67/51; H04L 67/55; G06Q 50/18; G06Q 50/188; G06N 20/00
See application file for complete search history.

(56) References Cited

U.S. PATENT DOCUMENTS

| | | |
|---|---|---|
| 2020/0042727 A1 | 2/2020 | Ogura et al. |
| 2020/0226703 A1 | 7/2020 | Abad et al. |
| 2021/0049303 A1* | 2/2021 | Morita .................. G06F 16/345 |

FOREIGN PATENT DOCUMENTS

| | | |
|---|---|---|
| JP | 2017-010521 A | 1/2017 |
| JP | 2020024511 A | 2/2020 |

OTHER PUBLICATIONS

Extended European Search Report mailed on Oct. 6, 2022 from counterpart European Patent Application No. 22168259.4, 8 pages.

* cited by examiner

*Primary Examiner* — Olugbenga O Idowu

(74) *Attorney, Agent, or Firm* — Procopio, Cory, Hargreaves & Savitch LLP

(57) ABSTRACT

Provided is a data intermediary system, comprising a processor and a storage unit. The storage unit stores therein usage information indicating usage of services. The processor acquires information indicating a data item that needs to be provided by a user as required by a provider of a first service that the user wishes to use, based on terms of use of the first service, selects a second service from services that the user has used in the past, based on the usage information, extracts a difference between the required data items and data items provided based on terms of use of the second service, outputs information indicating the extracted difference, and controls, when the user has accepted the terms of use of the first service, a flow of data from a provider holding the required data to the provider that provides the first service.

7 Claims, 14 Drawing Sheets

| ID | SERVICE NAME | SERVICE PROVIDER NAME | SERVICE CATEGORY | FREQUENCY OF USE | DURATION OF USE | TERMS OF USE | CREDIBILITY LEVEL |
|---|---|---|---|---|---|---|---|
| S01 | REMOTE DIAGNOSIS | COMPANY B | MAINTENANCE | ONCE A DAY | 5 YEARS | TERMS 1 | 80 |
| S02 | HAZARD MAP | COMPANY C | NAVIGATION | ONCE A MONTH | 1 YEAR | TERMS 2 | 60 |
| ... | | | | | | | |
| S10 | DRIVING INSURANCE | COMPANY D | INSURANCE | TWICE A WEEK | 2 YEARS | TERMS 10 | 70 |
| S11 | MUSIC DRIVE | COMPANY F | ENTERTAINMENT | THREE TIMES A WEEK | 2 MONTHS | TERMS 11 | 40 |
| S12 | DRIVING ADVICE | COMPANY Z | NAVIGATION | TWICE A MONTH | 6 MONTHS | TERMS 11 | 50 |

*FIG.6*

| ID | ITEM NAME | CONTENTS |
|---|---|---|
| A1 | SERVICE OVERVIEW | FOOD RECOMMENDATION SERVICE |
| A2 | PROVIDER | COMPANY A |
| A3 | DATA USED | NAME<br>EMAIL ADDRESS<br>...<br>LOCATION INFORMATION<br>VISIT HISTORY INFORMATION<br>REVIEW POSTING INFORMATION |
| A4 | DATA ACQUISITION METHOD | UPON STARTUP OF APPLICATION |
| A5 | PURPOSE OF USE | SERVICE OPTIMIZATION |
| A6 | DATA PROCESSING | ANONYMIZATION |
| A7 | THIRD PARTY PROVISION | N/A |
| A8 | STORAGE PERIOD | UNTIL APPLICATION IS UNINSTALLED |
| A9 | USER'S INVOLVEMENT | DISCLOSURE, SUSPENSION OF USE, UPDATE, DELETION, WITHDRAWAL OF CONSENT |
| A10 | CONTACT INFORMATION | PHONE NUMBER : XX-XX-XX<br>EMAIL ADDRESS : XX@COMPANY_A.COM<br>ADDRESS : XX, TOKYO |

FIG.8

| COMPARISON ITEM | SIMILARITY | DIFFERENCE |
|---|---|---|
| DATA ITEM | ITEM B<br>ITEM C<br>... | ITEM J<br>ITEM K<br>... |
| DATA PROCESSING | ANONYMIZATION | - |
| ⋮ | | |
| THIRD PARTY PROVISION | - | NOT PROVIDED |
| USER'S INVOLVEMENT | DISCLOSURE, SUSPENSION OF USE, UPDATE | - |

*FIG.9*

SERVICE NAME: FOOD RECOMMENDATION SERVICE

DIFFERENCE FROM THE TERMS OF USE OF THE PROVIDER MOST TRUSTED BY YOU

| COMPARISON ITEM | SIMILARITY | DIFFERENCE |
|---|---|---|
| DATA ITEM | ITEM B<br>ITEM C<br>... | ITEM J<br>ITEM K<br>... |
| DATA PROCESSING | ANONYMIZATION | - |
| ... | | |
| THIRD PARTY PROVISION | - | NOT PROVIDED |
| USER'S INVOLVEMENT | DISCLOSURE, SUSPENSION OF USE, UPDATE | - |

ACCEPT    DECLINE

PLEASE SEE BELOW FOR THE DETAILS OF THE TERMS OF USE

| USER ID | COMPARISON TARGET | | COMPARISON ITEM | | CONSENT REQUEST SKIPPING | |
|---|---|---|---|---|---|---|
| | COMPARISON PROVIDER ID (1312A) | COMPARISON TARGET CRITERIA (1312B) | TYPE COMPARISON (1313A) | ITEM COMPARISON (1313B) | CRITERIA FOR ACCEPTING TERMS (1314A) | CRITERIA FOR DECLINING TERMS (1314B) |
| USER 1 | SP1 | | ANONYMIZATION | | ANONYMIZATION | |
| USER 2 | | LARGEST NUMBER OF USERS | | DATA USED | DIFFERENCE BEING 10% OR LOWER | |
| ... | | | | | | |
| USER 50 | | LONGEST DURATION OF USE | | THIRD PARTY PROVISION | | TO BE PROVIDED |

*FIG. 13*

DATA INTERMEDIARY SYSTEM AND DATA INTERMEDIARY METHOD

CLAIM OF PRIORITY

The present application claims priority from Japanese patent application JP2021-90155 filed on May 28, 2021, the content of which is hereby incorporated by reference into this application.

BACKGROUND OF THE INVENTION

The present invention relates to a date intermediary technology.

When personal data is to be supplied to third-party service providers, it is necessary to obtain authorization from a user who owns the data. Japanese Patent Application Laid-open Publication No. 2020-24511 (Patent Document 1), for example, discloses a technique to simplify the process to obtain consent from a user. In Patent Document 1, personal data provided in response to the user's consent is recorded in the first period. If personal data is to be provided in the second period that comes after the first period, the amount of information provided in the first period and the amount of information provided in the second period are compared, and if the amounts differ from each other, the difference in information amount determines whether it is necessary to obtain consent from the user or not.

SUMMARY OF THE INVENTION

However, in Patent Document 1, it was necessary to compare the information amount of the data that has been provided to a third party before with the information amount of the data to be provided newly. If data needs to be provided to a third party that has not been received data before, then there is no past information to compare. Thus, for a third party that has not received data before, the consent procedure needs to be performed, which increases a burden on the user.

In order to solve at least one of the foregoing problems, a representative example of the present invention is a data intermediary system, comprising a processor and a storage unit, wherein the storage unit stores therein usage information indicating usage of a plurality of services that a user has used in the past, wherein the processor acquires information indicating a data item that needs to be provided by a user as required by a provider of a first service that the user wishes to use, based on terms of use of the first service, selects a second service from a plurality of services that the user has used in the past, based on the usage information, extracts a difference between the data items that needs to be provided based on the terms of use of the first service and data items provided based on terms of use of the second service, outputs information indicating the extracted difference, and controls, upon receiving information indicating that the user has accepted the terms of use of the first service, a flow of data from a provider holding the data that needs to be provided based on the terms of use of the first service to the provider that provides the first service.

According to an aspect of the present invention, it is possible to ease the burden of the user in the consent procedure for data provision required to use a service. The objects, configurations, and effects other than those described above will become apparent in the descriptions of embodiments below.

BRIEF DESCRIPTION OF THE DRAWINGS

FIG. 6 is a diagram for explaining an example of a service usage table stored in the data intermediary device of Embodiment 1 the present invention.

FIG. 8 is a diagram for explaining an example of a terms of use table stored in the data intermediary device of Embodiment 1 the present invention.

FIG. 9 is a diagram for explaining an example of a difference of terms table stored in the data intermediary device of Embodiment 1 the present invention.

FIG. 10 is a diagram for explaining an example of the consent request screen displayed by the data owner terminal constituting the data intermediary system of Embodiment 1 of the present invention.

FIG. 13 is a diagram for explaining an example of an user specification table stored in the data intermediary device of Embodiment 2 the present invention.

FIG. 146 is a diagram for explaining one example of the screen displayed to the user when a consent request for the user is skipped in Embodiment 2 of the present invention.

DETAILED DESCRIPTION OF THE EMBODIMENTS

Figure 1:
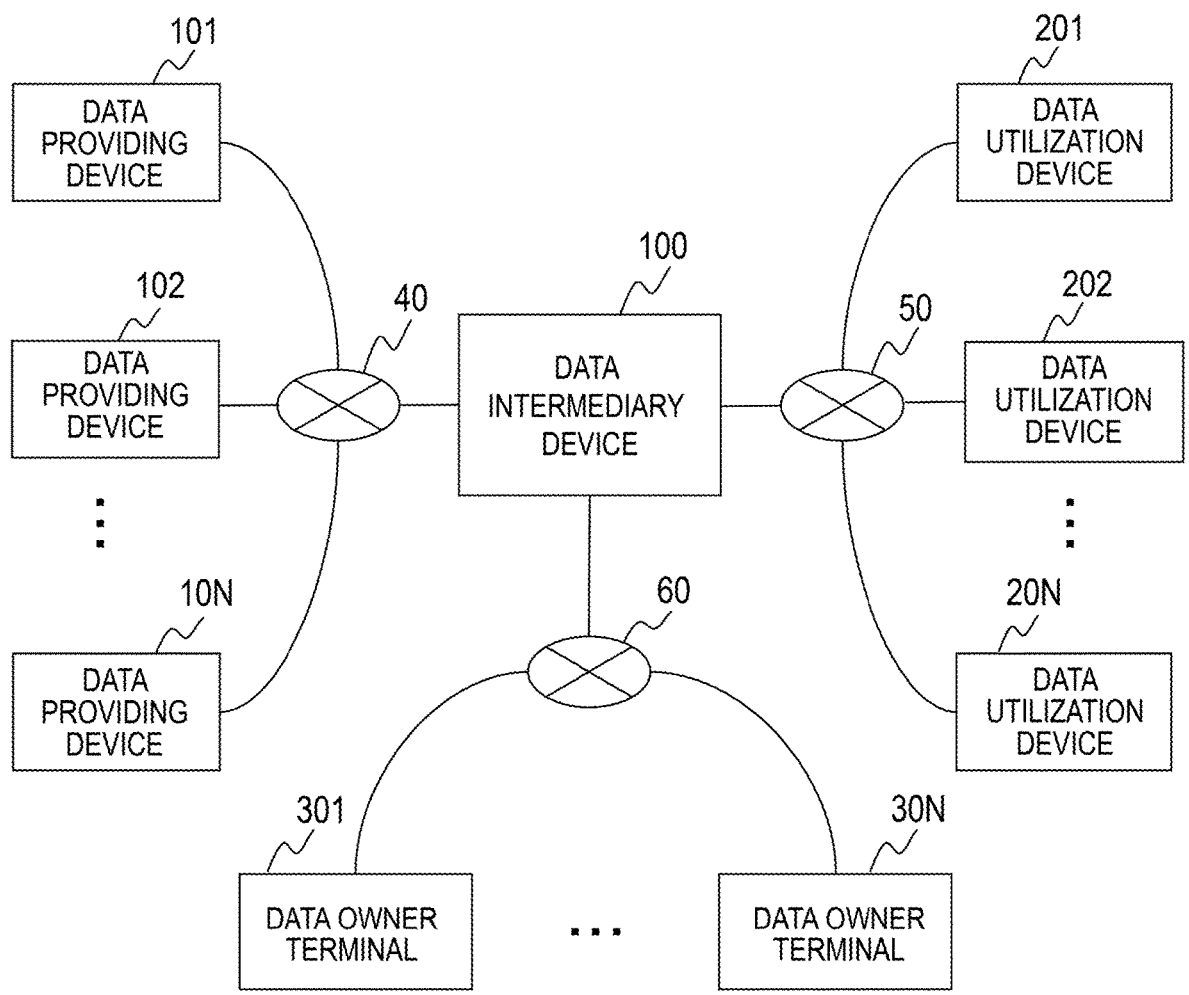
FIG. 1 illustrates an example of a data intermediary system configuration of Embodiment 1 of the present invention.

Below, embodiments of the present invention will be explained in detail with reference to figures. In all the figures, the same configurations and steps are given the same reference characters, and overlapping explanations are omitted.

Embodiment 1

<FIG. 1: Data Intermediary System Configuration>

FIG. 1 illustrates an example of a data intermediary system configuration of Embodiment 1 of the present invention.

In FIG. 1, the data intermediary system includes data providing devices 101, 102, . . . , 10N (N is an integer of 1 or greater), a data intermediary device 100, data utilization devices 201, 202, . . . , 20N, and data owner terminals 301, . . . 30N. The data intermediary device 100 is connected to a communication network 40, and the communication network 40 is connected to the data providing devices 101, 102, . . . , 10N. Also, The data intermediary device 100 is connected to a communication network 50, and the communication network 50 is connected to the data utilization devices 201, 202, . . . , 20N. Furthermore, the data intermediary device 100 is connected to a communication network 60, and the communication network 60 is connected to the data owner terminals 301, . . . , 30N.

The communication network 40, the communication network 50, and the communication network 60 may be the same network.

The data providing device 10N is a device used by a service provider that provides a service to users, and when a user uses the service, personal data regarding that user is accumulated in the data providing device 10N. Below, the data providing device 10N represents any one of the data providing devices 101, 102, . . . , 10N.

The data utilization device 20N is a device used by the provider that provides a service to users, and needs personal data of users accumulated in the data providing device 10N in order to provide the service. Below, the data utilization device 20N represents any one of the data utilization devices 201, 202, . . . , 20N.

The data owner terminal 30N is used by the user who owns personal data that is accumulated in the data providing device 10N to specify that they wish to use the service provided by the data utilization device 20N and authorize provision of their personal data to the data utilization device 20N, and to use the service. Below, the data owner terminal 30N represents any one of the data owner terminals 301, . . . , 30N.

The number of the data providing devices 10N, the number of the data utilization devices 20N, and the number of the data owner terminals 30N that constitute the data intermediary system may be appropriately selected, and those numbers do not have to be the same.

The data owner terminal 30N according to this embodiment may be realized by special hardware, or a configuration may be adopted where the data owner terminal 30N is constituted of a CPU (central processing unit), a memory, and the like, and the functions of respective units thereof are realized by the CPU executing computer programs for those functions. For example, the data owner terminal 30N may be a mobile communication terminal device such as a smartphone or a smart device of a GPS in a car, or may be a stationary communication device (such as a personal computer).

<FIG. 2: Configuration of Data Intermediary Device 100>

Figure 2A:
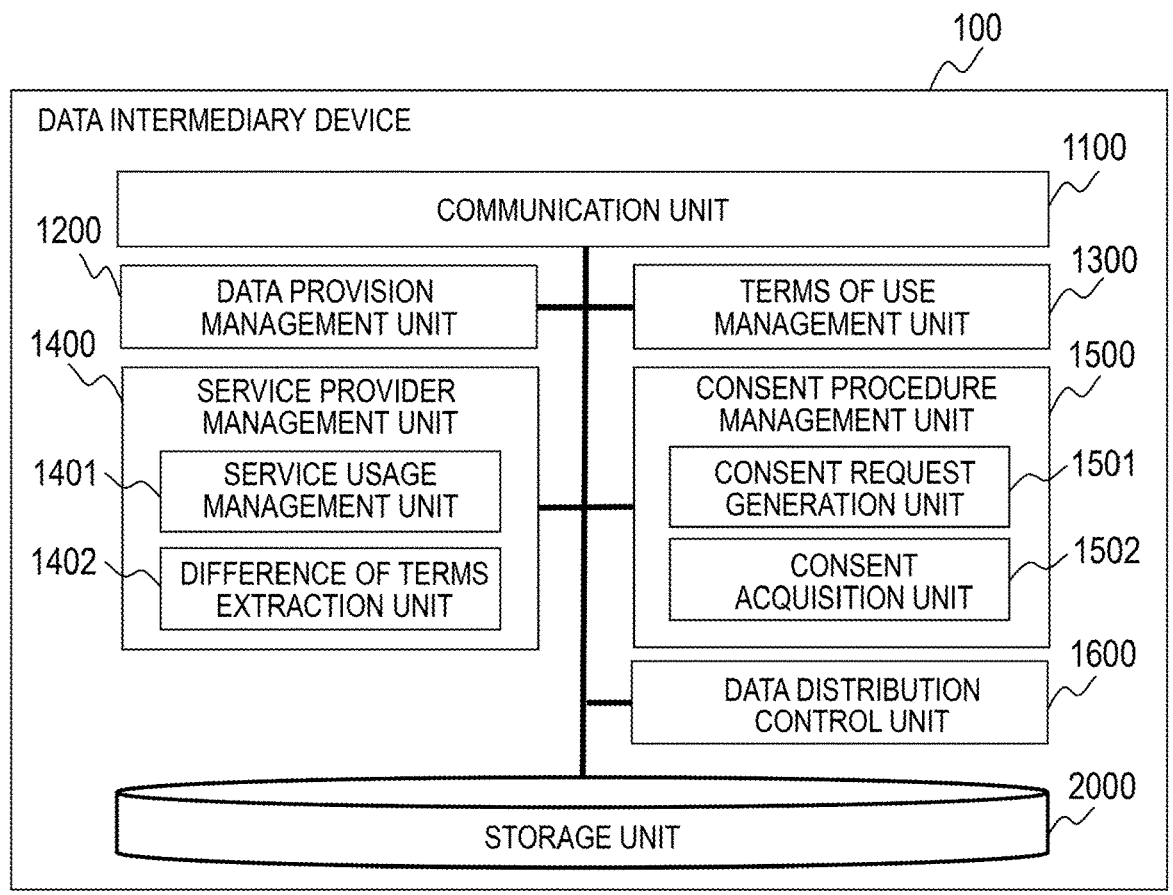
FIG. 2A is a block diagram illustrating an example of the configuration of a data intermediary device of Embodiment 1 the present invention.

FIG. 2A is a block diagram illustrating an example of the configuration of the data intermediary device 100 of Embodiment 1 the present invention.

The data intermediary device 100 includes a communication unit 1100, a data provision management unit 1200, a terms of use management unit 1300, a service provider management unit 1400, a consent procedure management unit 1500, a data distribution control unit 1600, and a storage unit 2000.

The communication unit 1100 communicates with the data providing device 10N via the communication network 40, communicates with the data utilization device 20N via the communication network 50, and communicates with the data owner terminal 30N via the communication network 60. For example, the communication unit 1100 receives terms of use for a service that the user wishes to use from the data utilization device 20N, and forwards it to the terms of use management unit 1300. The communication unit 1100 transmits the terms of use confirmed by the terms of use management unit 1300 to the data owner terminal 30N to obtain consent from the user on the terms. The communication unit 1100 then receives the result of the consent procedure from the data owner terminal 30N and the consent procedure management unit 1500 records the result of the consent procedure.

The data provision management unit 1200 records and manages data provided by the data providing device 10N to the data utilization device 20N when the user uses the service provided by the data utilization device 20N.

The terms of use management unit 1300 acquires terms of use to be agreed upon between the user and the service provider for the service provided by the data utilization device 20N that the user wishes to use, confirms that there are no errors, and manages the terms of use to be disclosed to the user.

The service provider management unit 1400 is constituted of a service usage management unit 1401 and a difference of terms extraction unit 1402.

The service usage management unit 1401 manages contents of the services, information of service providers, usage of services, terms of use, and the like for the services used by the user through the data owner terminal 30N.

The difference of terms extraction unit 1402 selects one service provider from the list of service providers for services being used by the user, which is managed by the service usage management unit 1401, and compares terms of use of the selected service provider with terms of use of a new service provider to extract the difference between the two terms.

The consent procedure management unit 1500 is constituted of a consent notification generation unit 1501 and a consent acquisition unit 1502.

The consent notification generation unit 1501 generates a consent request notification that is transmitted to the data owner terminal 30N via the communication unit 1100 based on the extraction results of the difference of terms extraction unit 1403 representing a difference between the terms of use of the provider currently used by the user and the terms of use of the provider that the user wishes to use. Upon receiving the notification generated by the consent notification generation unit 1501, the user accepts or declines the request using the data owner terminal 30N, and transmits the result to the data intermediary device 100.

The consent acquisition unit 1502 acquires and manages the result of the consent procedure by the user, which was received through the communication unit 1100.

The data distribution control unit 1600 controls distribution of user's personal data accumulated in the data providing device 10N to the data utilization device 20N based on the terms of use agreed by the user, which is managed by the consent procedure management 1500.

The storage unit 2000 stores data generated by or necessary for the functions of the communication unit 1100, the data provision management unit 1200, the terms of use management unit 1300, the service provider management unit 1400, the consent procedure management unit 1500, and the data distribution control unit 1600.

The data intermediary device 100 of this embodiment may be realized by special hardware, or a configuration may be adopted where the data intermediary device 100 is constituted of a CPU, a memory, and the like, and the functions of respective units thereof are realized by the CPU executing computer programs for those functions. For example, the data intermediary device 100 is constituted of a general computer such as a personal computer, and the respective functions of the data intermediary device 100 illustrated in FIG. 2A may be realized by the computer executing computer programs for realizing those function.

Figure 2B:
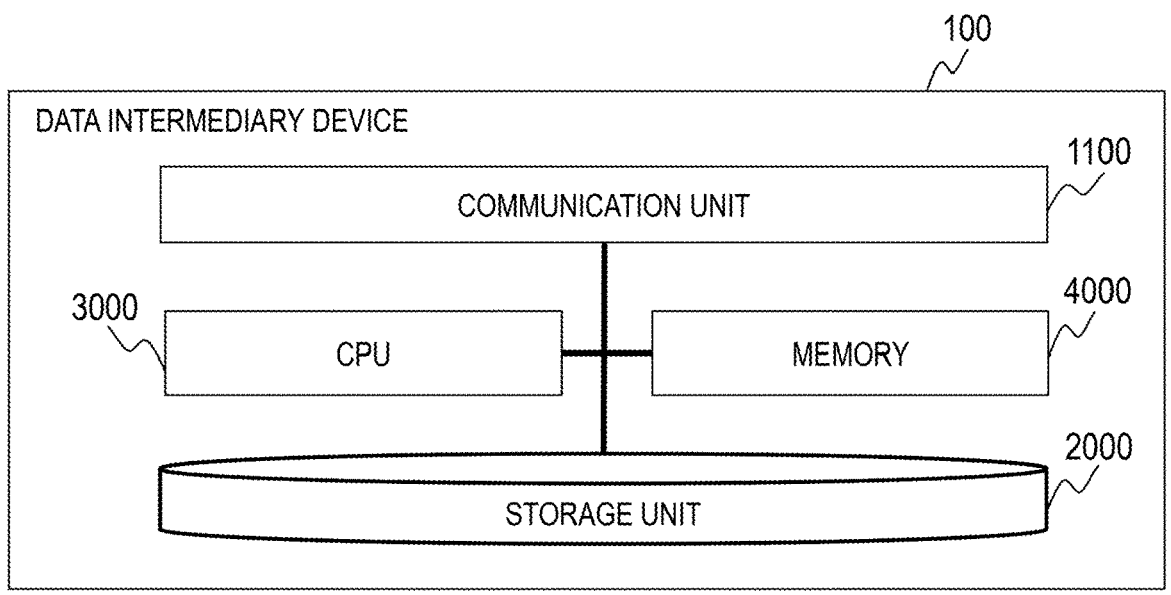
FIG. 2B is a block diagram illustrating an example of the hardware configuration of the data intermediary device of Embodiment 1 the present invention.

FIG. 2B is a block diagram illustrating an example of the hardware configuration of the data intermediary device 100 of Embodiment 1 the present invention.

The data intermediary device 100 may be constituted of a communication unit 1100, a CPU 3000, a memory 4000, and a storage unit 2000. In this case, computer programs for realizing the functions of the data provision management unit 1200, the terms of use management unit 1300, the service provider management unit 1400, the consent procedure management unit 1500, and the data distribution control unit 1600 are stored in the memory 4000, and those functions are realized by the CPU 3000 executing those programs. The functions of the computer programs may be realized by a single device, or by a plurality of devices connected to each other in such a manner that mutual communication is possible. Depending on whether the functions are realized by a single device or multiple devices, the data intermediary device may alternatively be referred to as a data intermediary system.

Next, the data intermediary method of this embodiment will be explained below.

Figure 3:
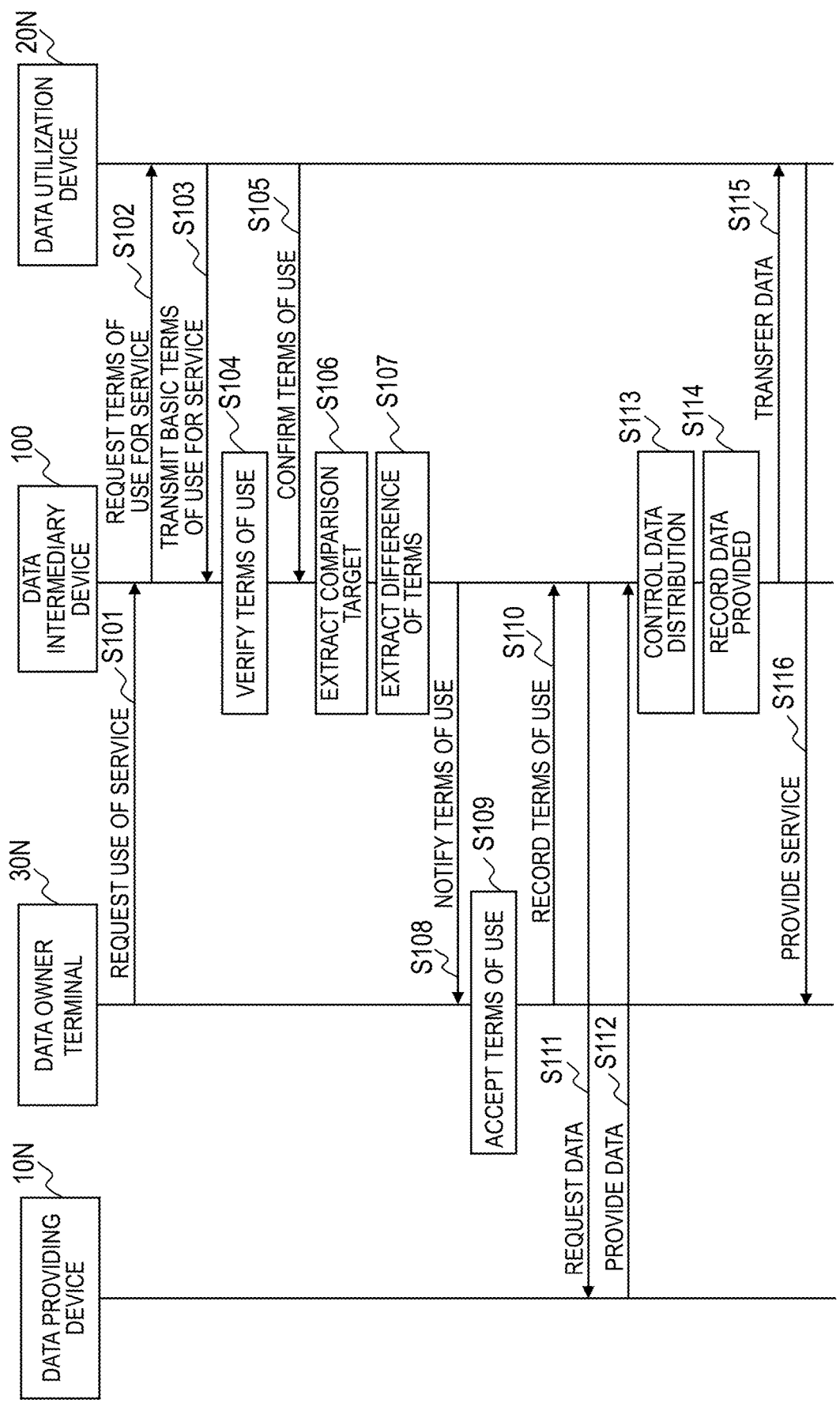
FIG. 3 is a sequence chart illustrating an example of a data intermediary method of Embodiment 1 of the present invention.

<FIG. 3: Steps for Using a Service>

With reference to FIG. 3, the data intermediary method of this embodiment will be explained. FIG. 3 is a sequence chart illustrating an example of the data intermediary method of Embodiment 1 of the present invention. Specifically, FIG. 3 illustrates a sequence from a point where a request to use a service is received from the user to a point where the user starts using the service.

In Step S101, the data owner terminal 30N transmits a request to use a service provided by the data utilization device 20N to the data intermediary device 100 in response to an operation by the user. The request to use the service is a message including a service D and a user ID. The service ID is identification information for a service provided by the data utilization device 20N. The user ID is identification information for a user. The data intermediary device 100 receives the request to use the service via the communication unit 1100. The data intermediary device 100 holds the service use request that was received.

In Step S102, the data intermediary device 100 transmits, to the data utilization device 20N corresponding to the service ID in the received service use request, a request for terms of use for the service ID via the communication unit 1100. The data intermediary device 100 is provided in advance with information linking the service Ds to the data utilization devices 20N. The request for the terms of use is a message including the service D, asking for terms of use specified by the service provider. The request for terms of use is received by the data utilization device 20N.

In Step S103, the data utilization device 20N transmits, to the data intermediary device 100, the terms of use corresponding to the service ID included in the received request for the terms of use. The terms of use data corresponding to the service ID is data including information representing the terms of use specified by the service provider that provides the service corresponding to the service ID.

The terms of use data received through the communication unit 1100 is managed by the terms of use management unit 1300 in a terms of use table. The terms of use table is stored in the storage unit 2000.

FIG. 8 is a diagram for explaining an example of the terms of use table stored in the data intermediary device 100 of Embodiment 1 the present invention.

As illustrated in FIG. 8, the terms of use table 800 includes an ID 801, an item name 802, and contents 803. The ID 801 is identification information for each item of the terms of use. The item name 802 represents the name of each item. Examples of the item names include a service overview, a provider, data used, a data acquisition method, purposes of use, data processing, provision to a third party, a storage period, user involvement, and contact information. The contents 803 include details of the terms for each item for the service.

FIG. 8 illustrates an example of the terms of use for the "food recommendation service" provided by "Company A". According to the terms of use illustrated here, in order to use this service, the user needs to provide information such as "name" "email address" "location information" "visit history information" and "review posting information" to the provider. Those pieces of information are acquired at startup of the application, are used for optimizing the service after anonymized, are not provided to a third party (an entity other than "Company A"), and are stored until the application is uninstalled. Furthermore, the user may be involved in disclosure, suspension of use, update, and deletion of the information as well as withdrawal of consent.

The "review" generally means information orally communicated. However, the review information in this embodiment is not limited to information orally communicated, but also includes information generated by users and exchanged between users. There is no limitation on the content of the reviews and distribution mode thereof, but a typical example is certain types of information, such as ratings, comments and the like from the user with regard to a service used by users, that are distributed through SNS (social networking service), review websites, and the like.

FIG. 8 illustrates a table constituted of three columns and eleven rows, but the number of columns and the number of rows of the terms of use table 800 are not limited to those. For example, for each item such as "name" and "email address", which is stored as the "data used", a data acquisition method, purposes of use, data processing, third party provision, a storage period, and involvement of the user may be set.

Returning to FIG. 3, in Step S104, the terms of use management unit 1300 retrieves the terms of use for that service from the storage unit 2000, and confirms that there are no errors in the terms of use for the service. If there is an error, the portion with the error is recorded, and the confirmation result is sent to the data utilization device 20N via the communication unit 1100.

In Step S105, the data utilization device 20N receives the terms of use for the service confirmed by the terms of use management unit 1300, and if there was an error, revises the terms of use for the service, and finalizes the terms of use so the terms can be disclosed to the user. The finalized terms of use for the service are sent to the communication unit 1100, and is stored in the storage unit 2000.

In Step S106, the service utilization management unit 1401 extracts a provider as a comparison target from the service providers being used by the user, in preparation for Step S107 where a difference between respective terms is extracted. At this time, the service usage management unit 1401 may calculate credibility levels of the service providers being used by the user, and select a provider as a comparison target based on their credibility level. For example, as the most appropriate provider to be compared, a provider with the highest credibility level is selected from the service providers being used by the user. However, it is not necessary to select the provider with the highest credibility level, as long as the credibility level of the selected provider is high. For example, a provider with a high credibility level may be selected by a method in which the user selects from a plurality of providers having at least a certain level of credibility (such as a plurality of providers with top credibility levels or a plurality of providers having a credibility level higher than a prescribed standard). An example of the method for calculating the credibility level will be explained below with reference to FIG. 4.

Figure 4:
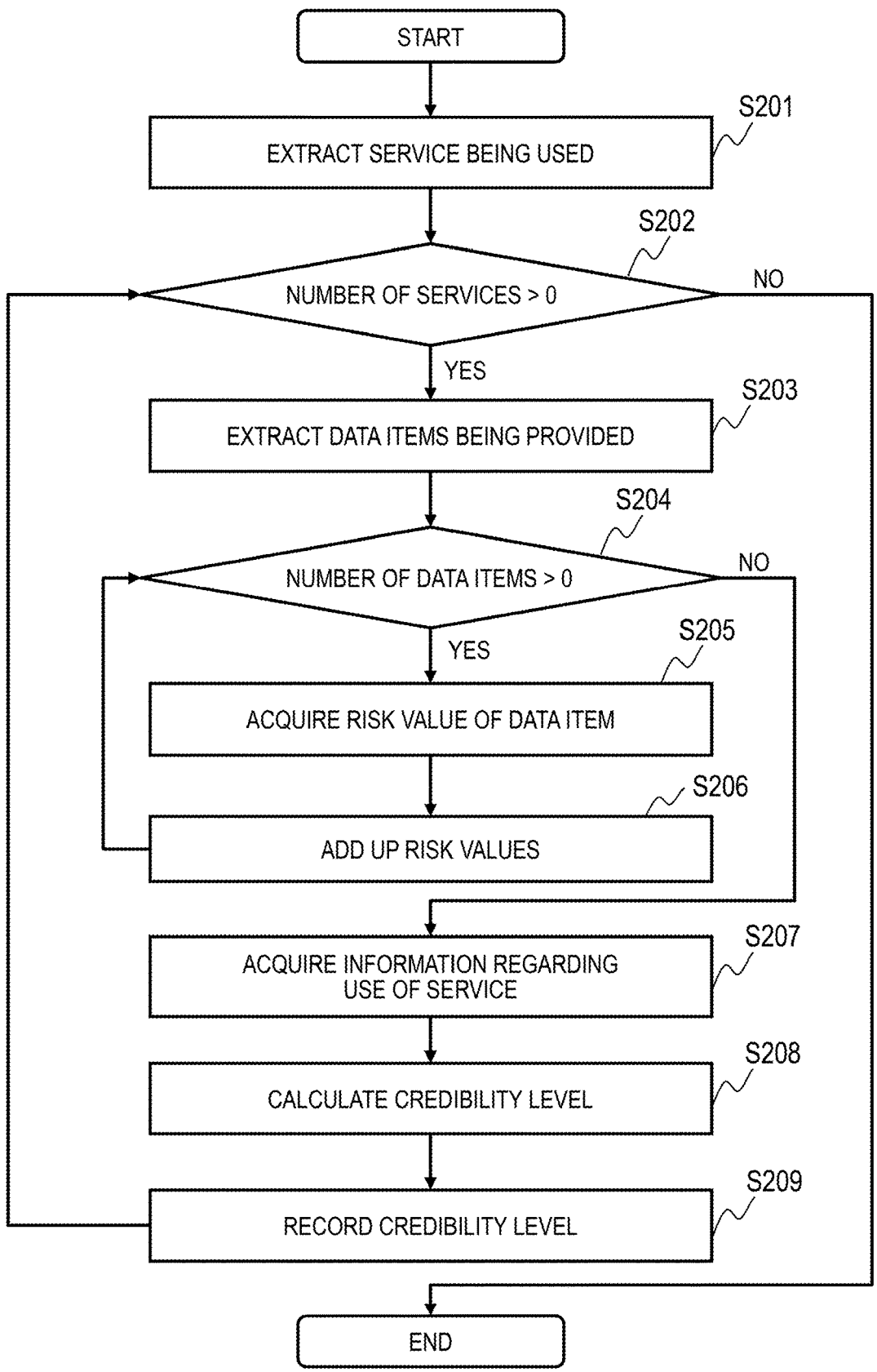
FIG. 4 is a flowchart illustrating an example of the process to calculate a credibility level of each service provider, which is performed by the data intermediary device of Embodiment 1 of the present invention.

<FIG. 4: Process to Calculate Credibility Levels of Service Providers>

FIG. 4 is a flowchart illustrating an example of the process to calculate a credibility level of each service provider, which is performed by the data intermediary device 100 of Embodiment 1 of the present invention.

In Step S201, the service usage management unit 1401 acquires the usage situation of the service being used by the user.

FIG. 6 is a diagram for explaining an example of a service usage table stored in the data intermediary device 100 of Embodiment 1 the present invention.

As illustrated in FIG. 6, the service usage table 600 includes an ID 601, a service name 602, a service provider name 603, a service category 604, a frequency of use 605, a duration of use 606, terms of use 607, and a credibility level 608.

The ID 601 is identification information for each service. The service name 602 is the name of the service. The service provider name 603 is the name of a provider providing the service. The service category 604 is classification information of the service content. For example, categories of the automobilerelated service include maintenance, navigation, insurance, and entertainment.

The frequency of use 605 is the number of times the user uses the service over a prescribed period. The duration of use 606 indicates how long the user have been using the service. The terms of use 607 is information for the terms of use of the service. The credibility level 608 indicates how much the user trusts a provider of the service. The calculation results of the credibility level obtained by the service usage management unit 1401 are stored in the credibility level 608.

FIG. 6 illustrates the service usage table 600 constituted of eight columns, but the configuration of the service usage table 600 is not limited to this.

Returning to FIG. 4, in Step S202, the service usage management unit 1401 confirms the number of services used by the user, which was acquired in Step S201, and holds the number of services as a counter value. If the counter value of the number of services is greater than zero, the process moves to Step S203. If the counter value of the number of services is zero, the calculation of the credibility level is ended.

In Step S203, the service usage management unit 1401 retrieves one service from the list of the services being used by the user, which was acquired in Step S201, and extracts data items that need to be provided by the user in order to use that service. First, the service usage management unit 1401 retrieves terms of use for that service from the service usage table 600, and extracts items related to data used for that service, from the terms of use for that service.

In Step S204, the service usage management unit 1401 confirms the number of data items retrieved in Step S203, and holds the number of data items as a counter value. If the counter value of the number of data items is greater than zero, the process moves to Step S205. If the counter value of the number of data items is zero, the process moves to Step S207.

In Step S205, the service usage management unit 1401 selects one data item from the data items retrieved in Step S203, and acquires a degree of importance of the data item from the data provision management unit 1200. The degree of importance indicates how important that data is for the owner of the data. For example, the degree of importance of the data may be a value indicating a degree of consequence (risk level) caused by an unintended use of the data such as data being abused by other people. In such a case, the degree of importance may also be referred to as a risk level.

Figure 7:
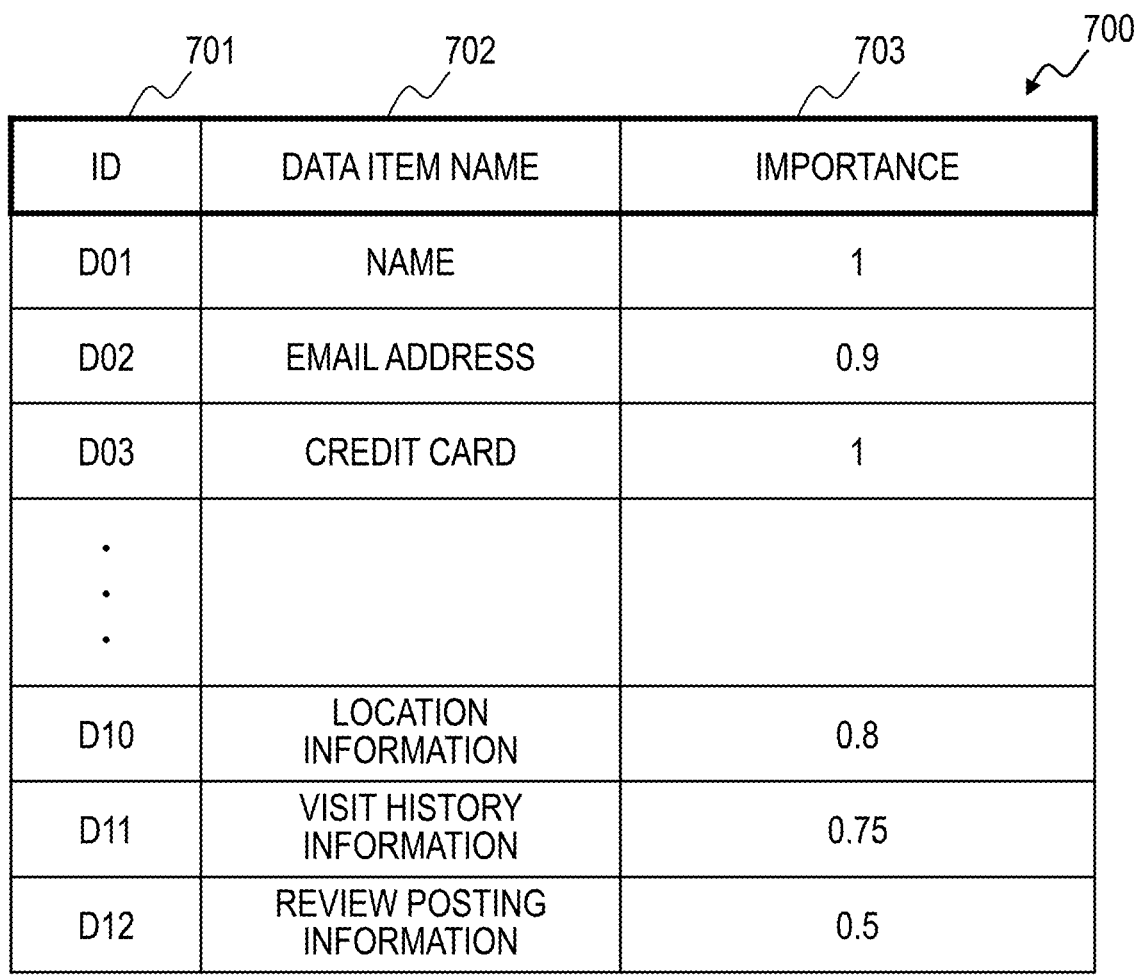
FIG. 7 is a diagram for explaining an example of a data importance table stored in the data intermediary device of Embodiment 1 the present invention.

FIG. 7 is a diagram for explaining an example of the data importance table stored in the data intermediary device 100 of Embodiment 1 the present invention.

As illustrated in FIG. 7, the data importance table 700 includes an ID 701, a data item name 702, and importance 703. The ID 701 is identification information for each data item. The data item name 702 is the name of each data item. The importance 703 indicates how important that data item for the user. In FIG. 7, a value in the data importance 703 is a value ranging from 0 to 1, for example, but the value of the data importance 703 is not limited to this.

The importance 703 may be specified by the user, which is the owner of the data, or may be calculated statistically based on the provision situation of the data to be provided to the provider. For example, a method may be adopted where a ratio of the amount of data provided is calculated for the data provided to respective providers managed by the data provision management unit 1200, and the data with a higher ratio is given a higher degree of importance. It is also possible to calculate the importance based on the possibility of the user not giving consent to provide data. For example, the importance may be calculated such that the greater the possibility of the user not giving consent to provide data, the higher the degree of importance.

FIG. 7 illustrates an example where the data importance table 700 is constituted of three columns, but the configuration of the data importance table 700 is not limited to this.

Returning to FIG. 4, in Step S206, the service usage management unit 1401 sums up the degrees of importance of all data items used for the service. Specifically, the service usage management unit 1401 calculates a total of the values representing the importance, which were acquired in Step S205. After the calculation is finished, the service usage management unit 1401 decreases the counter value of the number of data items, and returns to Step S204. Step S204 through Step S206 are repeated until the degrees of importance for all of the data items used for the service are added up.

In Step S207, the service usage management unit 1401 acquires information regarding the service usage from the service usage table 600. Examples of information acquired in this step include the frequency of use 605 indicating the number of times the service is used over a prescribed period, and the duration of use 606 indicating how long the user have been using the service. If the frequency of use 605 is used, the unit needs to be adjusted to ensure consistency among the respective services being used by the user. For example, if the largest unit is per month, daily usage is converted to 30 times per month. If the duration of use 606 is used, the respective unites need to be converted to the smallest unit. For example, if the smallest unit is per month, one year needs to be converted to 12 months.

In Step S208, the service usage management unit 1401 calculates a credibility level based on the degrees of data importance added up in Step S206 and the information regarding the service usage acquired in Step S207. For example, the credibility level may be calculated with Formula (1) below.

$$\text{Credibility Level} = \text{Total of Data Importance} \times \text{Frequency of Use} \times \text{Duration of Use} \quad (1)$$

According to this formula, a provider of a service that receives important data from the user, is used by the user more frequently and for a longer period of time is given a higher credibility level. However, the calculation of the credibility level is not limited to this formula. For example, the credibility level may be calculated solely based on the data importance, the frequency of use, or the duration of use, or a combination of any two of those. Alternatively, the credibility level may be set based on any other standards than those described above (such as the number of users for the service), or may be appropriately set by the user.

In the example above, a provider was selected as the comparison target based on the credibility level, and the service provided by the provider was selected as the comparison target, but the selection of a comparison target based on the information included in the service usage table 600 is not limited to this. For example, the user may select the same provider as the provider of the service they wish to use, or the user may select a service that belongs to the same category as the service they wish to use.

In Step S209, the service usage management unit 1401 records the credibility level calculated in Step S208 in the credibility level 608 of the service usage table 600. After the information is recorded, the service usage management unit 1401 decreases the counter value of the number of services, and returns to Step S202. Steps S202 to S209 are repeated until the credibility level is calculated for all of the service providers being used by the user.

Below, the explanation continues with reference to FIG. 3 again.

In Step S107, the difference of terms extraction unit 1402 compares the terms of use of the new service provider that the user wishes to use and the terms of use of one service provider being used by the user, which was extracted in Step S106, and identifies similarity and difference. An example of the method for extracting the difference between the respective terms will be explained below with reference to FIG. 5.

Figure 5:
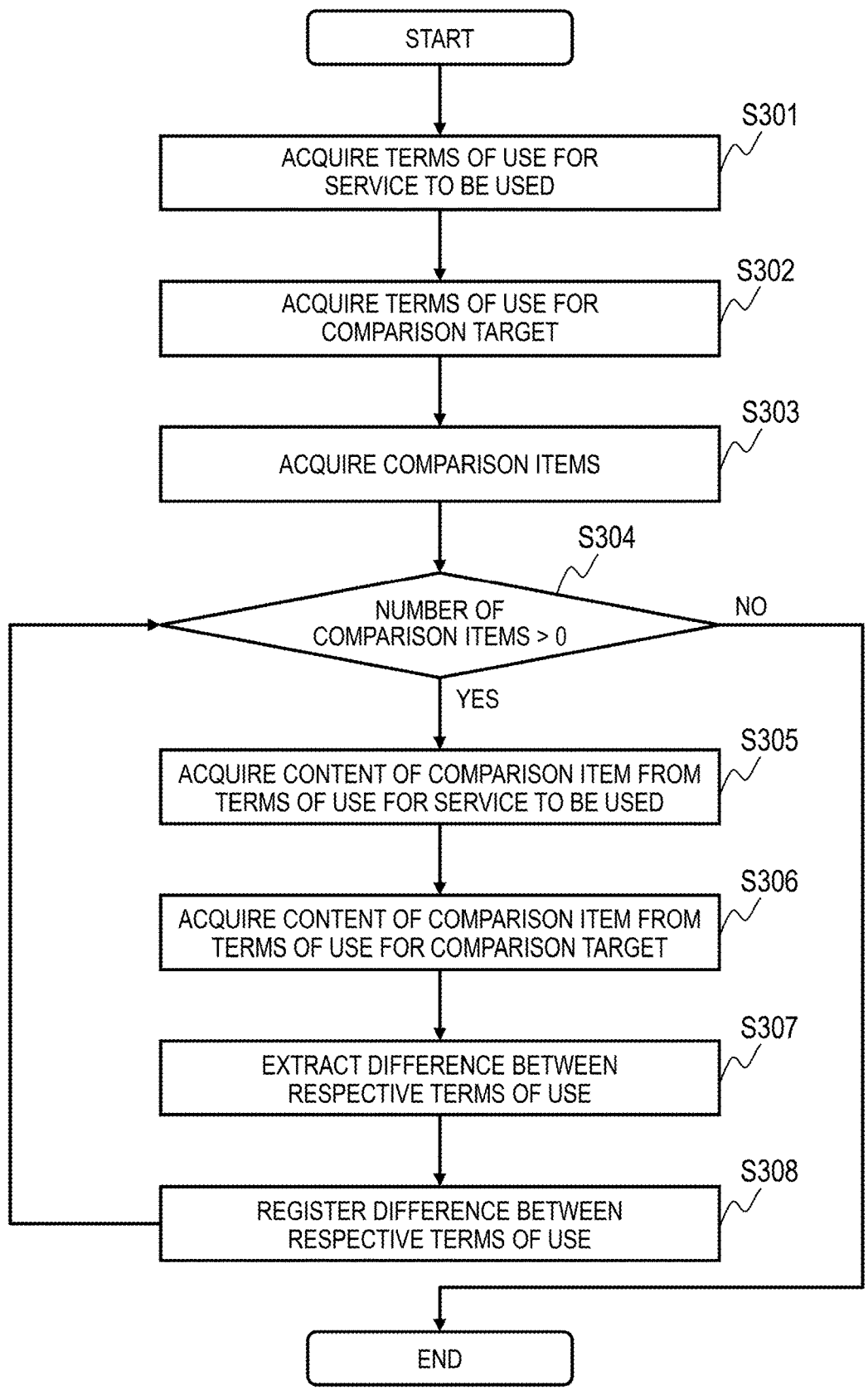
FIG. 5 is a flowchart illustrating an example of the process in which the data intermediary device of Embodiment 1 of the present invention extracts a difference between the respective terms of use.

<FIG. 5: Process to Extract Difference Between Terms>

FIG. 5 is a flowchart illustrating an example of the process in which the data intermediary device 100 of Embodiment 1 of the present invention extracts a difference between the respective terms of use.

In Step S301, the difference of terms extraction unit 1402 acquires the terms of use of the new service that the user wishes to use from the terms of use management unit 1300.

In Step S302, the difference of terms extraction unit 1402 acquires information of the service provider as the comparison target, which was extracted from the service usage management unit 1401 in Step S106, and acquires the terms of use of the service provider from the terms of use management unit 1300.

In Step S303, the difference of terms extraction unit 1402 acquires items to be compared between the terms of use of the new service provider the user wishes to use, which were acquired in Step S301, and the terms of use of the comparison target acquired in Step S302. Examples of the method to acquire comparison items includes a method of acquiring items specified in the terms of use. For example, with regard to the terms of use illustrated in FIG. 8, the service overview and the provider generally differ between the respective services, and thus, items except those are acquired as the comparison items. Examples of items acquired in this step include data items used by the service (such as name and email address), a data acquisition method, purposes of use, data processing, data provision to a third party, a storage period, involvement of the user, and contact information. All of those items may be compared, or the user may specify certain items of interest in advance so that only those items are compared.

In Step S304, the difference of terms extraction unit 1402 confirms the number of comparison items acquired in Step S303, and holds the number of comparison items as a counter value. If the counter value of the number of comparison items is greater than zero, the process moves to Step S305. If the counter value of the number of comparison items is zero, the process to extract a difference between the respective terms of use is ended.

In Step 305, the difference of terms extraction unit 1402 retrieves one item from the comparison items acquired in Step S303, and retrieves the content of that comparison item from the terms of use of the new service the user wishes to use, which were acquired in Step S302. For example, if the difference of terms extraction unit 1402 retrieves a comparison item that represents the data used by the service, then the content of the data used is retrieved from the terms of use table 800 of the new service the user wishes to use. In this example, a case where the name, the email address, the location information, the visit history information, and the review posting information are acquired as the list of data used will be explained.

In Step 306, for the comparison item retrieved in Step S304, the difference of terms extraction unit 1402 retrieves the content of the comparison item from the terms of use of the comparison target, which were acquired in Step S303. For example, if the difference of terms extraction unit 1402 retrieves a comparison item that represents the data used by the service, then the content of the data used is retrieved from the terms of use table 800 for the comparison target. In this example, a case where the name, the email address, the credit card, and the location information are acquired as the list of data used will be explained.

In Step S307, the difference of terms extraction unit 1402 compares the content of the comparison item retrieved in Step S305 with the content of the comparison item retrieved in Step S306, and identifies similarity and difference. In this example, the data used by the new service is user's name, email address, location information, visit history information, and review posting information. On the other hand, the data used by the service of the comparison target is user's name, email address, credit card and location information. When the two services are compared based on the data used, a list of data items including user's name, email address, and location information is identified as similarity. For the difference, the new service uses visit history information and review posting information, but not credit card information.

In Step S308, the difference of terms extraction unit 1402 registers the similarity and difference between the terms of use of the new service and the terms of use of the comparison target, which were extracted in Step S307.

FIG. 9 is a diagram for explaining an example of the difference of terms table stored in the data intermediary device 100 of Embodiment 1 the present invention.

As illustrated in FIG. 9, the difference of terms table 900 includes a comparison item 901, similarity 902 and difference 903. The comparison item 901 is the name of the item included in the terms of use. The similarity 902 is the content that is common between the respective terms of use with regard to the comparison item 901. The difference 903 is a difference between the respective terms of use with regard to the comparison item 901. FIG. 9 illustrates a table constituted of three columns, but the configuration of the difference of terms table 900 is not limited to this.

In the example of FIG. 9, when items included in the data used (name, email address, location information and the like) are compared between the terms of use of the new service and the terms of use of the comparison target, the item 8 and the item C are common between the two. On the other hand, the item J and the item K are only included in the terms of use of the new service. Data anonymization and user's involvement in disclosure, suspension of use, and revision of data are common between the two. Data provision to a third party is authorized in the terms of use of the comparison target, but not in the terms of use of the new service.

Returning to FIG. 5, after registering the similarity and difference between the terms of use of the new service and the terms of use of the comparison target, the difference of terms extraction unit 1402 decreases the counter value for the number of comparison items, and returns to Step S304. Step S304 through Step S308 are repeated until the process is completed for all of the comparison items. When all of the comparison items have undergone the process, the process to extract a difference between the respective terms of use is ended.

Below the explanation continues with reference to FIG. 3 again.

In Step S108, the consent notification generation unit 1501 generates a consent request notification including the terms of use of the new service the user wishes to use, which was confirmed in Step S105, and the difference between the terms of use of the new service and the terms of use of one of the service providers being used by the user, which was extracted in Step S107. The consent notification generation unit 1501 transmits the generated consent request notification to the data owner terminal 30N via the communication unit 1100.

In Step S109, the data owner terminal 30N gives notification to the user that the consent request notification has been received. The data owner terminal 30N then displays the details of the received consent request notification on the screen.

FIG. 10 is a diagram for explaining an example of the consent request screen displayed by the data owner terminal 30N constituting the data intermediary system of Embodiment 1 of the present invention.

As illustrated in FIG. 10, the consent request screen 1000 includes the name of the service 1001, difference 1002 of the terms of use between the new service provider and one of the service providers being used by the user, buttons 1003 and 1004 for the user to accept or decline the request, and details of the terms of use 1005. However, the format of the consent request screen 1000 is not limited to that of FIG. 10. The user accepts or declines the terms of use of the new service based on the information displayed on the consent request screen 1000, and transmits the information to the data intermediary device 100.

In Step S110, the consent acquisition unit 1502 acquires information representing the result of user's decision in Step S109 via the communication unit 1100, and records and manages the details such as which user has accepted what terms of use of which service, for example.

In Step S111, the data intermediary device 100 issues a request for the data required for the new service the user wishes to use to the data providing device 10N based on the terms of use accepted by the user and recorded in Step 110. The message requesting the data includes the user ID for identifying the user, the data items, and information indicating that the user has agreed to provide data.

In Step S112, upon receiving the request from the data intermediary device 100, the data providing device 10N confirms that the user's consent has been obtained, searches for necessary data using the user ID and the data items, and transmits the data to the data intermediary device 100.

In Step S113, the data provision management unit 1200 of the data intermediary device 100 performs necessary processes on the user's personal data required for the new service, which was received in Step S112, such that the data can be provided to the data utilization device 20N, and the data distribution control unit 1600 performs a control such that the data is provided to the correct data utilization device 20N.

In Step S114, the data intermediary device 100 records the data to be provided to the data utilization device 20N in Step S115. The data recorded in this step includes the time stamp, the user id, the service ID, and the data items.

In Step S115, the data intermediary device 100 transfers the data recorded in Step S114 to the data utilization device 20N via the communication unit 1100. The message transferred to the data utilization device 20N includes the user ID for identifying the user, the service 1 for identifying the service, and the data items required for the service.

In Step S116, the data utilization device 20N provides the service requested by the user via the data owner terminal 30N based on the user data received in Step S115.

According to this embodiment, a service provider trusted by the user (for example, the service provider most trusted by the user) is selected from the service providers being used by the user, and the terms of use of the service provider and the terms of use of the new service provider are compared to identify similarity and difference. This way, it is possible to obtain additional information to inform the user's decision to either accept or decline the terms of use, which helps the user to make a quicker decision and therefore reduces the burden in the consent procedure, if two or more service providers with a high credibility level are identified upon performing the comparison, a configuration may be adopted where the terms of use of each provider is compared with the terms of use of the new service, and the user is notified of a difference in each case.

Embodiment 2

Next, Embodiment 2 of the present invention will be explained. In Embodiment 2, processes are performed based on items and criteria that are specified by the user in advance in the comparison target extraction (Step S106), the difference of terms extraction (Step S107), and the notification of terms (Step S108). Except those differences, which are explained below, the respective units of the system of Embodiment 2 have the same functions as the respective units of Embodiment 1 given the same reference characters illustrated in FIGS. 1 to 10, and thus, the explanations thereof are omitted.

The process of Step S103 in Embodiment 2 will be explained below with reference to FIG. 11.

Figure 11:
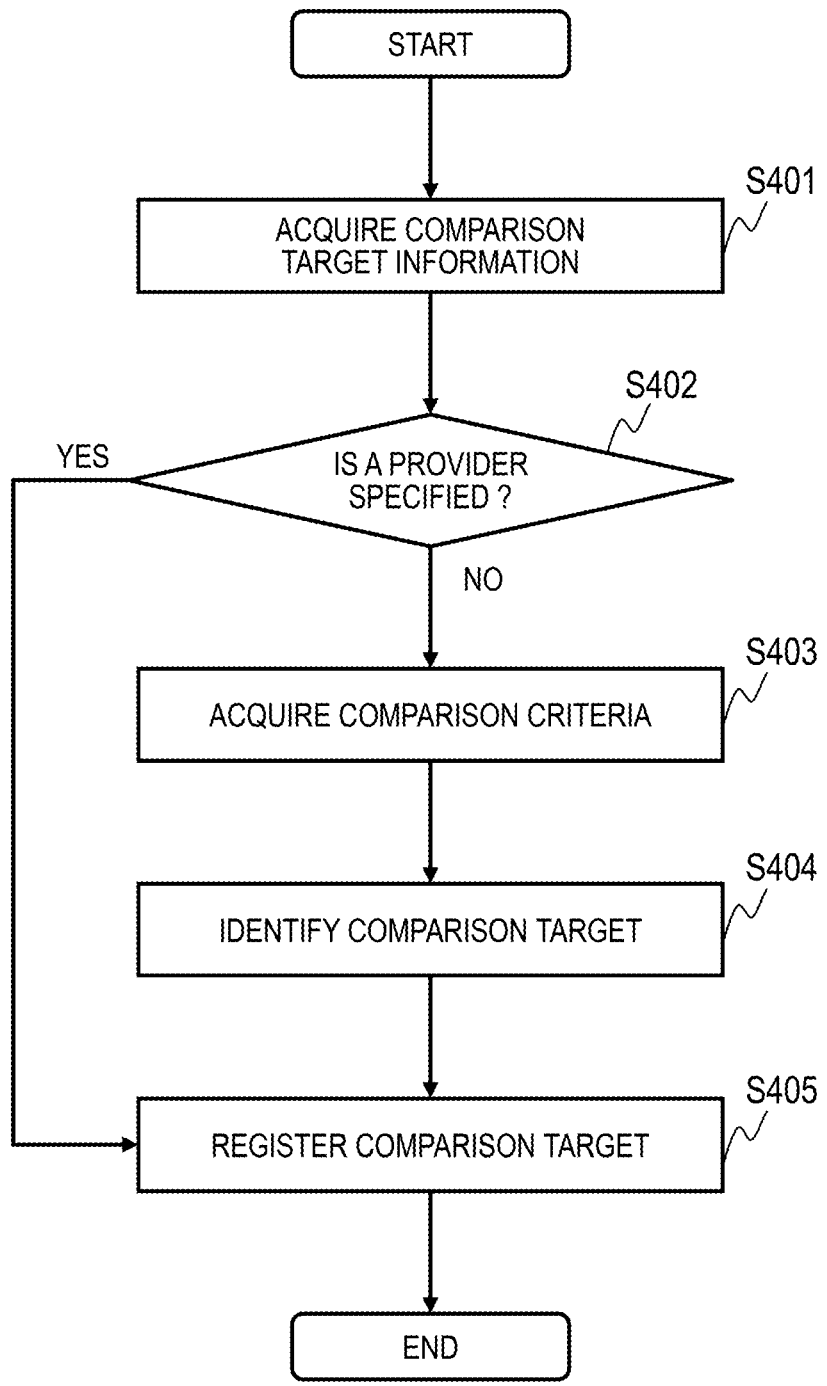
FIG. 11 is a flowchart illustrating an example of the process to extract a provider as a comparison target, which is performed by a data intermediary device of Embodiment 2 of the present invention.

<FIG. 11: Process to Extract a Provider as Comparison Target>

FIG. 11 is a flowchart illustrating an example of the process to extract a provider as a comparison target, which is performed by the data intermediary device 100 of Embodiment 2 of the present invention.

In Step S401, the service usage management unit 1401 acquires information regarding the comparison target specified by the user in advance. Information specified in advance by the user including the comparison information is managed by a user specification table stored in the storage unit 2000.

FIG. 13 is a diagram for explaining an example of the user specification table stored in the data intermediary device 100 of Embodiment 2 the present invention.

As illustrated in FIG. 13, the user specification table 1310 includes a user ID 1311, comparison target information 1312, comparison item information 1313, and consent request skipping information 1314. Each of those will be described later in detail. However, the configuration of the user specification table 1310 is not limited to that of FIG. 13.

In Step S401, the service usage management unit 1401 refers to the comparison target information 1312. The comparison target information 1312 includes a comparison provider ID 1312A and comparison target criteria 1312B. The comparison provider ID 1312A is identification information of the provider that is always extracted as the comparison target upon performing comparison. The comparison target criteria 1312B is criteria that is always used when the comparison target is extracted. The service usage management unit 1401 acquires the comparison provider ID 1312A and the comparison target criteria 1312B from the user specification table 1310.

In Step S402, the service usage management unit 1401 refers to the information acquired in Step S401, and confirms whether there is a value in the comparison provider ID 1312A. If there is a value in the comparison provider ID 1312A, the process moves to Step S405. If there is no value in the comparison provider ID 1312A, the process moves to Step S403.

In Step S403, the service usage management unit 1401 refers to the information acquired in Step S401, and acquires the comparison target criteria 1312B.

In Step S404, the service usage management unit 1401 extracts service providers that meet the criteria from the service usage table 600 as illustrated in FIG. 6, based on the criteria acquired in Step S403. For example, if the criteria of "the longest duration of use" is acquired as the comparison target criteria 1312B, the service usage management unit 1401 extracts a service provider that has been used by the user for the longest period of time from the service usage table 600.

In Step S405, the service usage management unit 1401 registers the comparison provider ID 1312A specified by the user, or the provider extracted in Step S404 as the comparison provider.

Next, the process of Step S107 in Embodiment 2 will be explained below with reference to FIG. 12.

Figure 12:
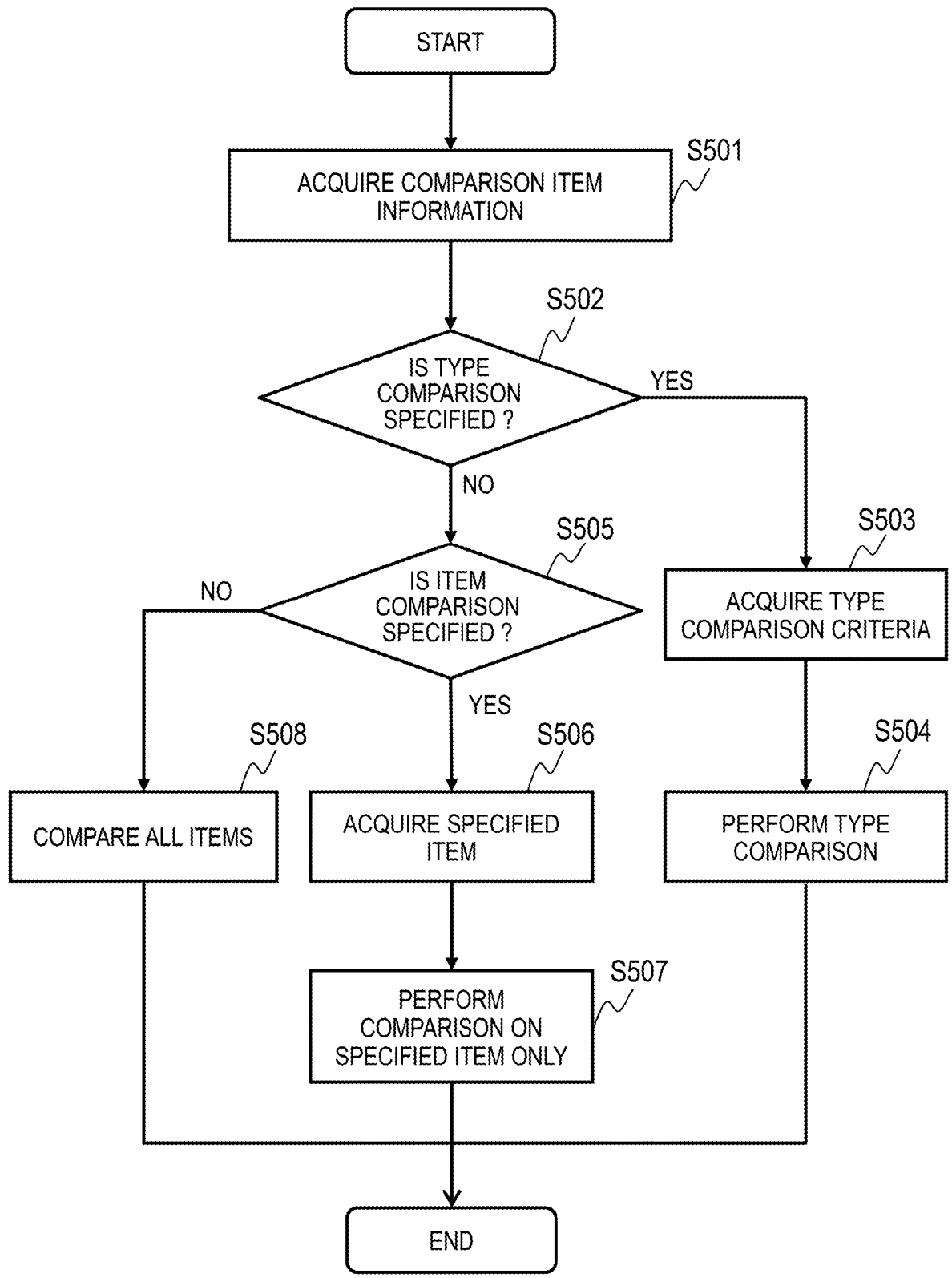
FIG. 12 is a flowchart illustrating an example of the process in which the data intermediary device of Embodiment 2 of the present invention calculates a difference between the respective terms of use.

<FIG. 12: Process to Extract Difference of Terms>

FIG. 12 is a flowchart illustrating an example of the process in which the data intermediary device 100 of Embodiment 2 of the present invention calculates a difference between the respective terms of use.

In Step S501, the difference of terms extraction unit 1402 acquires information regarding comparison items specified by the user in advance. Here, the difference of terms extraction unit 1402 acquires the comparison item information 1313 in the user specification table 1310 illustrated in FIG. 13. The comparison item information 1313 includes type comparison 1313A and item comparison 1313B.

The type comparison 1313A compares the terms of use of the new service the user wishes to use against predetermined types, and determines which type the terms of use of the new service the user wishes to use is categorized to. Examples of the types include an anonymization type where anonymization is mentioned in the terms of use, and a no third-party provision type where the terms of use specify that data will not be provided to a third party. As such, the type is information indicating the content or characteristics of terms of use, or information that allows the user to uniquely identify the format thereof. Thus, other types than those illustrated in FIG. 13 may be used.

The item comparison 13138 is information specifying items that the user thinks important. The process to extract difference in the respective terms is performed only on the items specified by the user. The difference of terms extraction unit 1402 acquires the type comparison information 1313A and the item comparison information 1313B.

In Step S502, the difference of terms extraction unit 1402 confirms whether the type comparison is specified or not in the type comparison information 1313A acquired in Step S501. If there is a value in the type comparison information 1313A, this means that the type comparison is specified, and thus, the process moves to Step S503. If there is no value in the type comparison information 1313A, this means that the type comparison is not specified, and thus, the process moves to Step S505.

In Step S503, the difference of terms extraction unit 1402 acquires criteria of the type comparison acquired in Step S501. For example, if the user has specified the anonymization type, anonymization is acquired as the criteria.

In Step S504, the difference of terms extraction unit 1402 compares respective terms of use by the type based on the comparison criteria acquired in Step S503, and identifies the type of the terms of use of the new service the user wishes to use. If the type comparison is specified, comparison by type takes priority When the comparison by type is completed, the process to extract difference between the respective terms of use is ended. One example of the screen displayed to the user in Step S109 of FIG. 3 in this situation will be explained with reference to FIG. 14A.

Figure 14A:
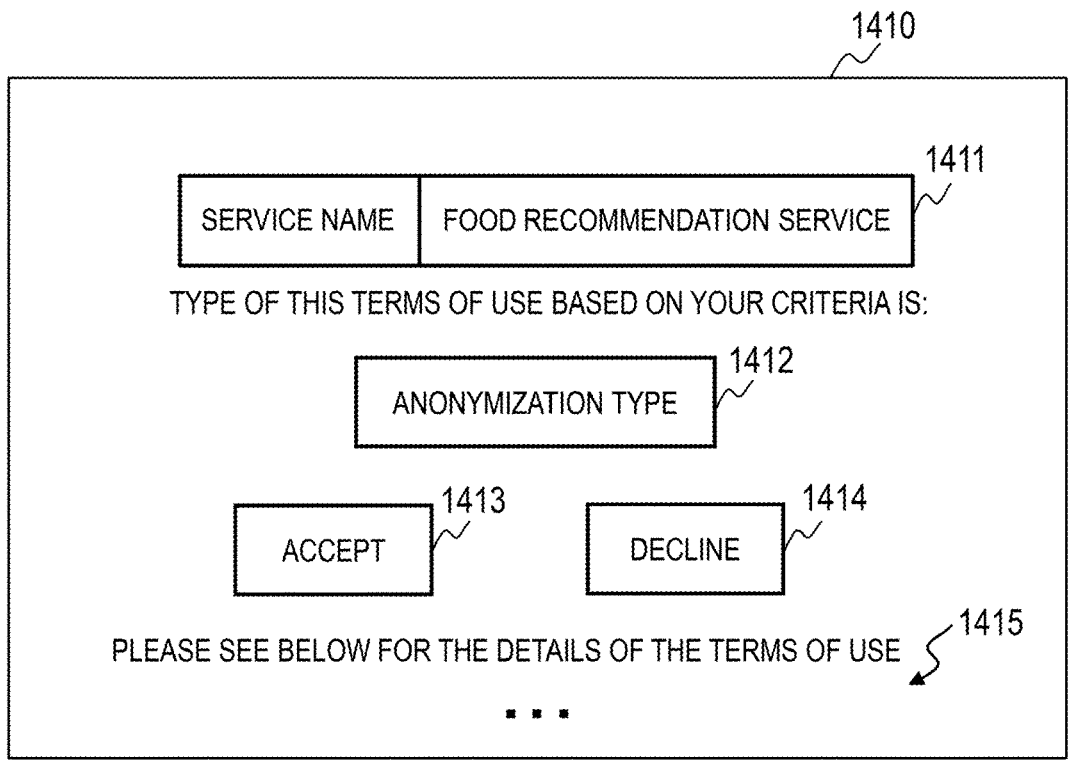
FIG. 14A is a diagram for explaining one example of the screen displayed to the user after type comparison was performed in Embodiment 2 of the present invention.

FIG. 14A is a diagram for explaining one example of the screen displayed to the user after type comparison was performed in Embodiment 2 of the present invention.

As illustrated in FIG. 14A, the notification screen 1410 includes the name of the service 1411, a result 1412 of type comparison performed on the terms of use, buttons 1413 and 1414 for the user to accept or decline the request, and details of the terms of use 1415. However, the notification screen is not limited to that of FIG. 14A.

In Step S502, the difference of terms extraction unit 1402 confirms whether comparison items are entered or not in the item comparison information 1313B acquired in Step S501. If there is a value in the item comparison information 1313B, this means that comparison items are specified, and thus, the process moves to Step S506. If there no value in the item comparison information 1313B, this means that comparison items are not specified, and thus, the process moves to Step S508.

In Step S506, the difference of terms extraction unit 1402 acquires a list of comparison items acquired in Step S501.

In Step S507, the difference of terms extraction unit 1402 extracts a difference between the respective terms of use only in those comparison items based on the list of comparison items acquired in Step S506. When a difference of terms has been extracted, the process to extract a difference between the respective terms of use is ended.

In Step S508, the difference of terms extraction unit 1402 extracts a difference between the respective terms of use on all items in a manner similar to Embodiment 1. When a difference of terms has been extracted, the process to extract a difference between the respective terms of use is ended.

Next, Step S108 in Embodiment 2 will be explained below.

In Step S108, the consent notification generation unit 1501 skips a consent request based on the criteria specified by the user. As illustrated in FIG. 13, the user specification table 1310 includes consent request skipping information 1314. The consent request skipping information 1314 includes criteria 1314A for accepting terms and criteria 1314B for declining terms. Those criteria are specified by the user. If the criteria 1314A for accepting terms is met, the process to request a user's consent is skipped, and user's intention of accepting the terms is always communicated. If the criteria 1314B for declining terms is met, the process to request a user's consent is skipped, and user's intention of declining the terms is always communicated.

The consent notification generation unit 1501 acquires the criteria 1314A for accepting terms and the criteria 1314B for declining terms from the user specification table 1310, and confirms whether one of the criteria 1314A for accepting terms and the criteria 1314B for declining terms is met based on the information indicating a difference between the terms of use, which was extracted in Step S107. If neither criteria is met, processes similar to those of Embodiment 1 are performed. If the criteria 1314A for accepting terms or the criteria 1314B for declining terms is met, the result of either accepting or declining the terms and the reason thereof are presented to the user instead of asking for their consent. One example of a screen displayed to the user in Step S109 of FIG. 3 in this situation will be explained with reference to FIG. 14B.

Figure 14B:
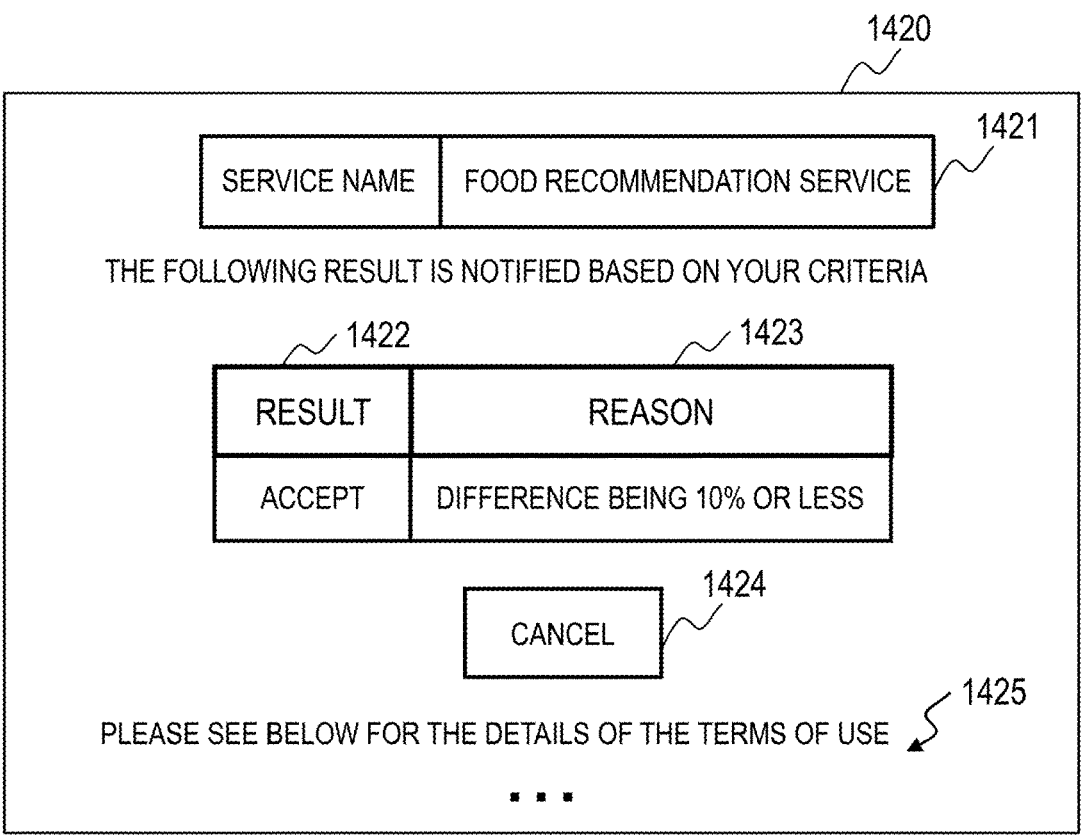

FIG. 14B is a diagram for explaining one example of the screen displayed to the user when a consent request for the user is skipped in Embodiment 2 of the present invention.

As illustrated in FIG. 146, the notification screen 1420 includes the name of the service 1421, a determination result 1422, a determination reason 1423, a cancel button 1424, and details of the terms of use 1425. However, the notification screen is not limited to that of FIG. 148.

For example, in the example of USER2 in FIG. 13, terms of use of the service with the largest number of users are extracted as the comparison target, and the item for the data used in the terms of use is compared with the item for the data used in the terms of use of the new service the use wishes to use. As a result, if "the difference being 10% or less", which is the criteria for accepting terms, is met, "Accept" is displayed for the determination result 1422, and "difference being 10% or less" is displayed for the reason 1423. If the user interacts with the cancel button 1424, this acceptance is canceled. The notification screen 1420 may also include a "confirm" button (not shown in the figure) so that the acceptance is confirmed when the user interacts with this confirm button.

As described above, according to Embodiment 2 of the present invention, each user may appropriately specify a provider as the comparison target for the terms of use of the provider of the new service they wish to use (Comparison provider ID 1312A). Alternatively, the user may appropriately specify criteria for selecting a provider for the comparison target. Furthermore, it is possible to appropriately select one or more data items to be compared from data items in the terms of use as illustrated in FIG. 8, for example.

Each user may also specify criteria for accepting data provision based on terms of use, or criteria for declining data provision based on terms of use. For example, it is possible to specify criteria that "a difference between the terms of use of the provider of the new service and the terms of use of the comparison target provider does not exceed a prescribed threshold (10% or less, for example)". Alternatively, it is possible to specify criteria to be met by the terms of use of a provider of the new service the use wishes to use. For the latter, a value of any one of the data used, data acquisition method, purpose of use, data processing, third-party provision, storage period, user's involvement and the like shown in FIG. 8 may be specified for the criteria. Examples thereof includes accepting the terms if data anonymization is performed, and declining the terms if data is provided to a third party. Then, if the terms of use of the new service provider the user wishes to use meet the criteria, data provision may be accepted or declined regardless of the comparison result with the comparison target.

This way, the user can freely specify criteria regarding the consent procedure, and it is possible to extract a provider or an item to be compared based on the criteria specified by the user. As a result, it is possible to adjust the comparison process in accordance with the user's preferences, such as performing data comparison for items that are important to the user, and skipping data comparison for items that are not important to the user. Also, the consent procedure can be skipped based on the criteria for accepting terms or the criteria for declining terms specified by the user, which can ease the burden on the user in the consent procedure.

A system according to an embodiment of the present invention may be configured as follows.

(1) A data intermediary system, including a processor (the CPU 3000, for example) and a storage unit (at least one of the memory 4000 and the storage unit 2000, for example), wherein the storage unit stores therein usage information (the service usage table 600, for example) indicating usage of a plurality of services that a user has used in the past; wherein the processor acquires information indicating data items that a provider of a first service that the user wishes to use requires the user to provide, based on terms of use of the first service (Step S103, for example), selects a second service from a plurality of services that the user has used in the past, based on the usage information (Step S106, for example), extracts a difference between the data items that needs to be provided based on the terms of use of the first service and data items provided based on terms of use of the second service (Step S107, for example), outputs information indicating the extracted difference (Step S108, for example), and controls, upon receiving information indicating that the user has accepted the terms of use of the first service, a flow of data from a provider holding the data that needs to be provided based on the terms of use of the first service to the provider that provides the first service, (Steps S111 to S115, for example).

This makes it possible to ease the burden of the user in the process of giving consent to data provision required to use a service.

(2) In (1) described above, the usage information includes at least one of a service name, a provider name, a service category, a frequency of use, a duration of use, terms of use, and a credibility level of the provider for a plurality of services that the user has used in the past, and the processor selects, as the second service, a service with a greater frequency of use, a service with a longer duration of use, or a service provided by a provider having a higher credibility level, among the plurality of services that the user has used in the past.

This makes it possible to extract data required to use the service, a frequency of use of the service, and the like from the service usage, and to extract an appropriate service as a comparison target. Also, by comparing the terms of use of the extracted service provider with the terms of use of the new service the user wishes to use, and identifying a difference between the respective terms, it is possible to reduce an amount of information to be checked to determine whether the terms of use should be accepted or not.

(3) In (2) described above, the storage unit stores therein importance information (the data importance table 700, for example) indicating a degree of importance of each data item provided based on terms of use of a plurality of services that the use has used in the past, and the processor calculates the sum of degrees of importance of data items provided based on the terms of use for each of the plurality of services that the use has used in the past, and calculates the credibility level such that the credibility level becomes higher as the sum of degrees of importance is greater.

This makes it possible to extract an appropriate service as a comparison target.

(4) In (3) described above, the importance is an indicator of a magnitude of a risk when data is abused.

This makes it possible to extract an appropriate service as a comparison target.

(5) In (3) described above, the processor calculates the credibility level such that the credibility level becomes higher as the frequency of use is greater, as the duration of use is longer, and as the importance is greater (calculated by Formula (1), for example), and selects, as the second service, a service provided by a provider having a high credibility level.

This makes it possible to extract an appropriate service as a comparison target.

(6) In (2) described above, the storage unit stores therein information (the item comparison 1313B, for example) specifying data items to be compared, and the processor extracts, for the data items to be compared, a difference between data items that need to be provided based on the terms of use of the first service and data items provided based on terms of use of the second service.

This way, it is possible to extract an item to be compared based on the criteria specified by the user.

(7) In (2) described above, the storage unit stores therein at least one of a first criteria (the criteria 1314A for accepting terms, for example) to be met for the user to accept the terms of use of the first service, and a second criteria (the criteria 1314B for declining terms, for example) to be met for the user to decline the terms of use of the first service, and if the difference meets the first criteria, the processor determines that the user accepts the terms of use of the first service, and if the difference meets the second criteria, the processor determines that the user declines the terms of use of the first service.

This way, it is possible to appropriately make the comparison in accordance with the user's preferences. Also, the consent procedure can be skipped based on the criteria, which can ease the burden on the user in the consent procedure.

(8) In (2) described above, the storage unit stores therein at least one of a third criteria (the criteria 1314A for accepting terms, for example) to be met by the terms of use of the first service for the user to accept the terms of use of the first service, and a fourth criteria (the criteria 1314B for declining terms, for example) to be met by the terms of use of the first service for the user to decline the terms of use of the first service, and if the difference meets the third criteria, the processor determines that the user accepts the terms of use of the first service, and if the difference meets the fourth criteria, the processor determines that the user declines the terms of use of the first service.

This way, the consent procedure can be skipped based on the criteria, which can ease the burden on the user in the consent procedure.

(9) In (8) described above, the third criteria and the fourth criteria are criteria related to any one of a data item that needs to be provided based on the terms of use of the first service, a method to acquire the data, a purpose of use of the data, whether the data is to be anonymized or not, whether the data is to be provided to a third party or not, a storage period of the data, and involvement of the user in handling of the data.

This way, the consent procedure can be skipped based on the criteria, which can ease the burden on the user in the consent procedure.

The present invention is not limited to the embodiments described above, and may include various modification examples. The embodiments described above, for example, were explained in detail such that the present invention is understood more clearly and they shall not necessarily be interpreted to include all of the configurations described above. Also, it is possible to replace part of the configuration of one embodiment with a configuration of another embodiment, and it is also possible to add a configuration of one embodiment to a configuration of another embodiment. Furthermore, another configuration may be added to a part of the configuration of each embodiment, and a part of the configuration of each embodiment may be deleted or replaced.

Part or all of the respective configurations, functions, processing units, processors, and the like described above may be realized by hardware such as designing with an integrated circuit, for example. The respective configurations, functions, and the like described above may be realized by software with a processor interpreting and executing programs that realize the respective functions. Information such as programs, tables, and files for realizing the respective functions can be stored in a storage device such as a non-volatile semiconductor memory, a hard disk drive, a solid-state drive (SSD), or a computer readable non-temporary data storage medium such as an IC card, SD card, or DVD.

The control lines and information lines needed for explanation were illustrated above, but it does not mean that all of the control lines and information lines in a product were illustrated. In actuality, almost all of the configurations are mutually connected.

What is claimed is:

1. A data intermediary system, comprising:
a processor; and
a storage unit, wherein the storage unit stores therein usage information indicating usage of a plurality of services that a user has used in the past, the usage information includes at least one of a service name, a provider name, a service category, a frequency of use, a duration of use, terms of use, and a credibility level of the provider for a plurality of services that the user has used in the past;

wherein the storage unit stores therein importance information indicating a degree of importance of each data item provided based on terms of use of a plurality of services that the user has used in the past;

wherein the processor acquires information indicating a data item that needs to be provided by a user as required by a provider of a first service that the user wishes to use, based on terms of use of the first service, selects a second service from a plurality of services that the user has used in the past, based on the usage information, extracts a difference between the data items that needs to be provided based on the terms of use of the first service and data items provided based on terms of use of the second service, outputs information indicating the extracted difference, controls, upon receiving information indicating that the user has accepted the terms of use of the first service, a flow of data from a provider holding the data that needs to be provided based on the terms of use of the first service to the provider that provides the first service, calculates a sum of degrees of importance of data items provided based on the terms of use for each of the plurality of services that the use has used in the past, and calculates the credibility level such that the credibility level becomes higher as the frequency of use is greater, as the duration of use is longer, as the degree of importance in greater, and as the sum of the degrees of importance is greater, wherein the processor selects, as the second service, a service provided by a provider having a high credibility level, among the plurality of services that the user has used in the past.

2. The data intermediary system according to claim 1, wherein the importance is an indicator of a magnitude of a risk if data was abused.

3. The data intermediary system according to claim 1, wherein the storage unit stores therein information specifying a data item to be compared, and wherein the processor extracts, for the data item to be compared, a difference between data items that need to be provided based on the terms of use of the first service and data items provided based on terms of use of the second service.

4. The data intermediary system according to claim 1, wherein the storage unit stores therein at least one of a first criteria to be met for the user to accept the terms of use of the first service, and a second criteria to be met for the user to decline the terms of use of the first service, and wherein, if the difference meets the first criteria, the processor determines that the user accepts the terms of use of the first service, and if the difference meets the second criteria, the processor determines that the user declines the terms of use of the first service.

5. The data intermediary system according to claim 1, wherein the storage unit stores therein at least one of a third criteria to be met by the terms of use of the first service for the user to accept the terms of use of the first service, and a fourth criteria to be met by the terms of use of the first service for the user to decline the terms of use of the first service, and wherein, if the terms of use of the first service meet the third criteria, the processor determines that the user accepts the terms of use of the first service regardless of the difference, and if the terms of use of the first service meet the fourth criteria, the processor determines that the user declines the terms of use of the first service regardless of the difference.

6. The data intermediary system according to claim 5, wherein the third criteria and the fourth criteria are criteria related to any one of a data item that needs to be provided based on the terms of use of the first service, a method to acquire the data, a purpose of use of the data, whether the data is to be anonymized or not, whether the data is to be provided to a third party or not, a storage period of the data, and involvement of the user in handling of the data.

7. A data intermediary method performed by a data intermediary system including a processor and a storage unit, the storage unit storing therein usage information indicating usage of a plurality of services that a user has used in the past, the data intermediary method comprising:

a step in which the storage unit storing therein usage information indicating usage of a plurality of services that a user has used in the past, the usage information includes at least one of a service name, a provider name, a service category, a frequency of use, a duration of use, terms of use, and a credibility level of the provider for a plurality of services that the user has used in the past;

wherein the storage unit stores therein importance information indicating a degree of importance of each data item provided based on terms of use of a plurality of services that the user has used in the past a step in which the processor acquires information indicating a data item that needs to be provided by a user as required by a provider of a first service that the user wishes to use, based on terms of use of the first service;

a step in which the processor selects a second service from a plurality of services that the user has used in the past, based on of the usage information;

a step in which the processor extracts a difference between the data item that needs to be provided based on the terms of use of the first service and a data item that has been provided based on terms of use of the second service;

a step in which the processor outputs information indicating the extracted difference;

a step in which, upon receiving information indicating that the user has accepted the terms of use of the first service, the processor controls a flow of data from a provider holding the data that needs to be provided based on the terms of use of the first service to the provider that provides the first service, a step in which the processor calculates a sum of degrees of importance of data items provided based on the terms of use for each of the plurality of services that the use has used in the past, and a step in which the processor calculates the credibility level such that the credibility level becomes higher as the frequency of use is greater, as the duration of use is longer, as the degree of importance in greater, and as the sum of the degrees of importance is greater, wherein the processor selects, as the second service, a service provided by a provider having a high credibility level, among the plurality of services that the user has used in the past.

\* \* \* \* \*